3,634,450
1-PHENYLPYRROLES
Jerold Alan Last, Princeton, and Saul Lewis Neidleman,
   Lawrence Township, N.J., assignors to E. R. Squibb
   & Sons, Inc., New York, N.Y.
No Drawing. Filed Apr. 16, 1969, Ser. No. 816,786
            Int. Cl. C07d 27/26
U.S. Cl. 260—313.1                              6 Claims

ABSTRACT OF THE DISCLOSURE

Disclosed herein are 1-phenylpyrroles which are halogenated in the 2- or 2,5-positions. These compounds possess antimicrobial activity and are prepared by reacting 1-phenylpyrrole with an active source of halogen. These compounds are useful as antimicrobial agents.

SUMMARY OF THE INVENTION

Various halogenated phenylpyrroles are known to the art. However, substitution in the 2- or 2,5-positions is not readily accomplished since pyrroles readily undergo condensation. Thus, the process of preparing simple ring-substituted pyrryl halides is complicated, if not impossible. It has bzeen discovered that by reacting 1-phenylpyrrole with an active source of halogen, the corresponding 2-halo- and 2,5-dihalo-1-phenylpyrroles can be recovered.

DESCRIPTION

This invention relates to compounds of Formula I:

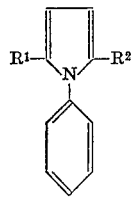

(I)

wherein $R^1$ is hydrogen or halogen and $R^2$ is halogen.

The products of this invention can be prepared by reacting a compound of Formula II:

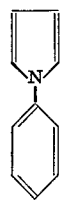

(II)

with an active source of halogen to yield compounds of Formula III:

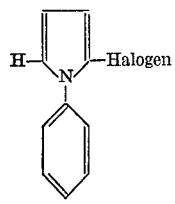

(III)

and Formula IV:

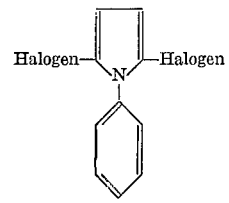

(IV)

By the term halogen is meant bromo, chloro or iodo.

The halogenated pyrroles of this invention are prepared by reacting 1 mole of 1-phenylpyrrole with 1–2 moles of the desired source of active halogen. This reaction is carried out at a temperature of from about 10° to about 60° in a polar solvent, such as aqueous dioxane.

The compounds of Formulae III and IV thus formed are separated by extraction into a water immiscible organic solvent, e.g., chloroform, ethyl acetate, or butanol, with chloroform preferred. The organic solvent extract is dried with, for example, anhydrous sodium sulfate and concentrated in vacuo to a small volume. The extract is fractionated into its components by thin layer chromatography on a suitable solid, for example, silica gel, using a suitable solvent, for example, 10% benzene in hexane. Under these conditions Compounds III and IV, the halogenated compounds, are easily separable.

Suitable halogenating agents that may be utilized in the invention are N-halo lower alkanedioic acid imides, e.g., N-bromosuccinimide or N-chlorosuccinimide; N-haloamides, such as, N-bromoacetamide and N-chloroacetamide; the chloroperoxidase of *Coldariomyces fumago*; or t-butyl hypoiodite.

The compounds of the invention have been found to possess anti-microbial activity and as such can be utilized in control of such microorganisms as *Staphylococcus aureus*; *Trichophyton mentagrophytes*; *Escherichia coli*; *Streptococcus pyogenes*; *Bacillus cereus*; and *Bacillus subtilis*.

The following examples are illustrative of the invention. All degrees are in degrees centigrade, unless otherwise set forth:

EXAMPLE 1

Ten mg. of 1-phenylpyrrole are dissolved in 15 ml. dioxane. Six ml. of pH 4.4 acetate buffer, prepared by mixing 6 gm. of sodium acetate with 6.6 ml. of glacial acetic acid and diluting to 100 ml. with water are added. To this are added 10 mg. of N-bromosuccinimide (NBS). The mixture is stirred 15 minutes at room temperature. The reaction is terminated by the addition of 100 ml. of water, followed by extraction of products with 50 ml. chloroform in 5 equal portions. Bioautography of discs dipped into the chloroform phase showed good antimicrobial activity against *S. aureus*; *E. coli*; and *C. albicans*. The parent 1-phenylpyrrole is not active under these conditions.

The chloroform extract is dried with sodium sulfate, concentrated, and further resolved into its components by thin layer chromatography on silica gel, using 10% benzene in hexane as the developing solvent. The products, 2-bromo-1-phenylpyrrole and 2,5-dibromo-1-phenylpyrrole, are obtained.

EXAMPLE 2

The conditions of Example 1 are repeated, except 200 mg. of 1-phenylpyrrole are dissolved in 15 ml. dioxane, and 6 ml. of the buffer of Example 1 are added. The bands corresponds to 2-bromo-1-phenylpyrrole, and 2,5-dibromo-1-phenylpyrrole are eluted from silica with acetonitrile and pooled. This extract is concentrated to dryness, dissolved in methanol, and assayed by a two-fold tube dilution assay against various bacteria. This pooled material is not active at less than 50 μg./ml. against *Escherichia coli* or *Candida albicans*; it inhibited the growth of *Staphylococcus aureus* 209 p. at a concentration of 4.9 μg./ml.

EXAMPLE 3

The procedure of Example 2 is repeated in all particulars, except 500 mg. of 1-phenylpyrrole and 1000 mg. of N-bromosuccinamide are dissolved in 15 ml. of dioxane, and the isolated individual products are tested for antibiotic activity against various organisms by a two-fold tube dilution assay. The results are shown in Table 1:

TABLE 1

|  | MIC, μg./ml. | | |
| --- | --- | --- | --- |
|  | 1-phenyl-pyrrole | 2-bromo-1-phenylpyrrole | 2,5-diBr-PP |
| *Stapylococcous aureus* | ≥50 | 8.1 | 3.3 |
| *Trichophyton mentagrophytes* | ≥25 | 16 | 11 |
| *Escherichia coli* | ≥50 | 50 | 50 |
| *Streptococcus pyogenes* | ≥50 | 4.7 | 1.2 |
| *Bacillus cereus* | ≥50 | 12.5 | 1.8 |
| *Bacillus subtilis* | ≥50 | 9.4 | 3.6 |

Following the procedure of Example 1 but substituting N-chlorosuccinimide in lieu of N-bromosuccinimide the products obtained are 2-chloro-1-phenylpyrrole and 2,5-dichloro-1-phenylpyrrole. Bioautography of discs dipped into the chloroform phase will show good antimicrobial activity.

What is claimed is:

1. A compound having the formula:

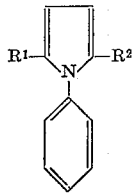

wherein $R^1$ is hydrogen, bromo, chloro or iodo and $R^2$ is bromo, chloro or iodo.

2. A compound in accordance with claim 1 having the formula:

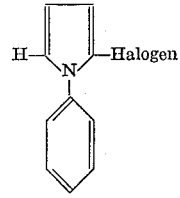

halogen is bromo, chloro or iodo.

3. A compound in accordance with claim 1 having the name 2-bromo-1-phenylpyrrole.

4. A compound in accordance with claim 1 having the name 2,5-dibromo-1-phenylpyrrole.

5. A compound in accordance with claim 1 having the name 2-chloro-1-phenylpyrrole.

6. A compound in accordance with claim 1 having the name 2,5-dichloro-1-phenylpyrrole.

References Cited

UNITED STATES PATENTS 2,600,289   6/1952   Bordner _____ 260—313.1

ALEX MAZEL, Primary Examiner

J. A. NARCAVAGE, Assistant Examiner

U.S. Cl. X.R.

260—999